Oct. 19, 1971          L. M. SMITH          3,613,336
HAY SWATHING MACHINE
Filed Oct. 22, 1969                         6 Sheets-Sheet 1

Fig. 1

INVENTOR
LORAN M. SMITH
BY
Dunlap, Laney, Hessin & Dougherty
ATTORNEYS

Oct. 19, 1971    L. M. SMITH    3,613,336
HAY SWATHING MACHINE

Filed Oct. 22, 1969    6 Sheets-Sheet 4

INVENTOR
LORAN M. SMITH

BY
Dunlap Henry, Hessin & Dougherty
ATTORNEYS

3,613,336
HAY SWATHING MACHINE
Loran M. Smith, P.O. Box 641, Chickasha, Okla. 73018
Continuation-in-part of application Ser. No. 606,797,
Jan. 3, 1967. This application Oct. 22, 1969, Ser.
No. 868,560
Int. Cl. A01d 43/08
U.S. Cl. 56—2  16 Claims

ABSTRACT OF THE DISCLOSURE

A self-propelled hay swather having hydraulic drive motors individually driving and controlling the ground engaging driving wheels. The hay swather includes a cutter bar at the forward end thereof, a reel rotatable to move the hay toward the cutter bar, with the reel being disposed in an elevated position above and forwardly of the cutter bar, a pair of conditioning rollers for partially crushing or breaking the stems of the hay, and cooperating, oppositely disposed augers to direct the hay into a centrally disposed windrow. The augers, reel, and conditioning rollers are driven independently from yet another hydraulic motor, and a fourth hydraulic motor drives the cutter bar. Transport wheels and lifting means are provided for the hay swather for enabling over-the-road transport thereof.

RELATED APPLICATIONS

This application is a continuation-in-part of my co-pending U.S. application Ser. No. 606,797 filed Jan. 3, 1967, and entitled "Hay Swathing Machine," now abandoned.

BACKGROUND OF THE INVENTION

Field of the invention

This invention generally relates to improvements in agricultural implements, and more particularly, relates to implements for use in cutting, conditioning, and gathering hay into windrows.

Brief description of the prior art

Various types of hay swathing machines have been heretofore proposed and a number are now marketed and function fairly effectively. Most of these swathing machines, however, very complex in construction and even the more complex are, in many instances, limited in the capacity of hay which can be cut and windrowed in a given period of time. Moreover, some types of hay swathing implements are designed primarily for cutting a particular type of hay and will not perform well when grains or other types of hay are cut.

One hay swathing machine which has been heretofore proposed is that which is described and depicted in my co-pending application Ser. No. 606,797 hereinbefore described. This machine performs quite effectively with most types of hay encountered. However, I have discovered that the performance and versatility of the machine can be improved to a substantial extent by certain structural alterations thereto.

BRIEF DESCRIPTION OF THE PRESENT INVENTION

The present invention comprises a self-propelled hay swather which includes a main frame to which is attached a forwardly extending frame and a rearwardly extending frame. On the forwardly extending frame there is mounted a cutter bar which is drivingly connected to a hydraulic motor for reciprocation of the cutter bar in a direction which is transverse or normal with respect to the direction of travel of the swather apparatus as a whole. Above and slightly forward of the cutter bar is a reel of generally cylindrical configuration, and having angled fingers projecting from the outer periphery thereof. The reel functions to move hay into the cutter bar as the swathing machine is moved over the ground.

To the rear of the cutter bar and positioned for receiving cut hay therefrom are a pair of cooperating conditioning rollers which function to partially crush or break the stems of the cut hay. The conditioning rollers and the reel are, of course, rotatably mounted on the forwardly extending frame, and are movable on this frame with the cutter bar. To the rear of the conditioning rollers in a position to receive conditioned hay therefrom are a pair of transversely spaced, cooperating auger conveyors which function to move cut and conditioned hay in toward the central position with respect to the swather apparatus, and to windrow the cut and conditioned hay at this point. The augers are adjustable on the framework so that they may be moved forwardly into a position in which they replace the conditioner rollers for the purpose of using the swather apparatus for cutting and windrowing certain types of hay, and particularly grains. The paired auger conveyors, the conditioner rollers, and the reel are all driven from a hydraulic motor which is operated independently of the hydraulic motor which drives the cutter bar.

The swather apparatus further includes a pair of ground engaging wheels which are rotatably supported on the main framework, and which are each individually driven by individual hydraulic motors. Finally, transport wheels and lifting means are provided for the hay swather to enable it to be placed in a status for over-the-road travel.

From the foregoing broad description of the invention, it will have become apparent that it is a major object of the invention to provide a hay swather which is relatively simple in construction and efficient in operation for the cutting, conditioning, and placing of hay in separate rows from whence the hay can be acted upon by a hay baler or other pickup mechanism.

Another object of the present invention is to provide a hay swather which will obtain a more uniform distribution of conditioned hay into a windrow, whereby the hay will cure in less time, thereby enabling subsequent hay baling operations or pickup operations to be conducted sooner than possible without conditioning of the hay.

A further object of the invention is to provide a hay swather having conditioning rollers which are drivingly interconnected in such a manner as to retain them in predetermined timed relationship during their rotation for effectively conditioning hay passed between a pair of adjacent rollers.

Still another important feature of the invention is to at a relatively high speed without causing wear on the provide a hay swather having transport wheels which may be lowered into operative position when a lifting mechanism is employed to enable the swather to be elevated off of the road surface for transport over the road hydraulic drive system and other components of the hay swather.

Another important object of the present invention is to provide a compact and economically constructed and operated hay swather which will be efficient and more productive than presently available hay swathers.

Another object of the invention is to provide a hay swather which is flexible or adaptable in its forms of utilization, being able to handle different types of hay crops and grains by adjustment of the types of conditioning brought to bear on such crops.

Another object of the invention is to provide a hay swather apparatus in which gearing, chain drives, cams, and other mechanical actuating devices are minimized, and direct hydraulic drives to a maximum number of operating parts are effected with a relatively simple hydraulic system permitting independent control of such parts.

Other objects and advantages will become apparent as the following detailed description of the invention is read in conjunction with the accompanying drawings which illustrate the invention.

DETAILED DESCRIPTION OF A PREFERRED EMBODIMENT OF THE INVENTION

Figure 1:
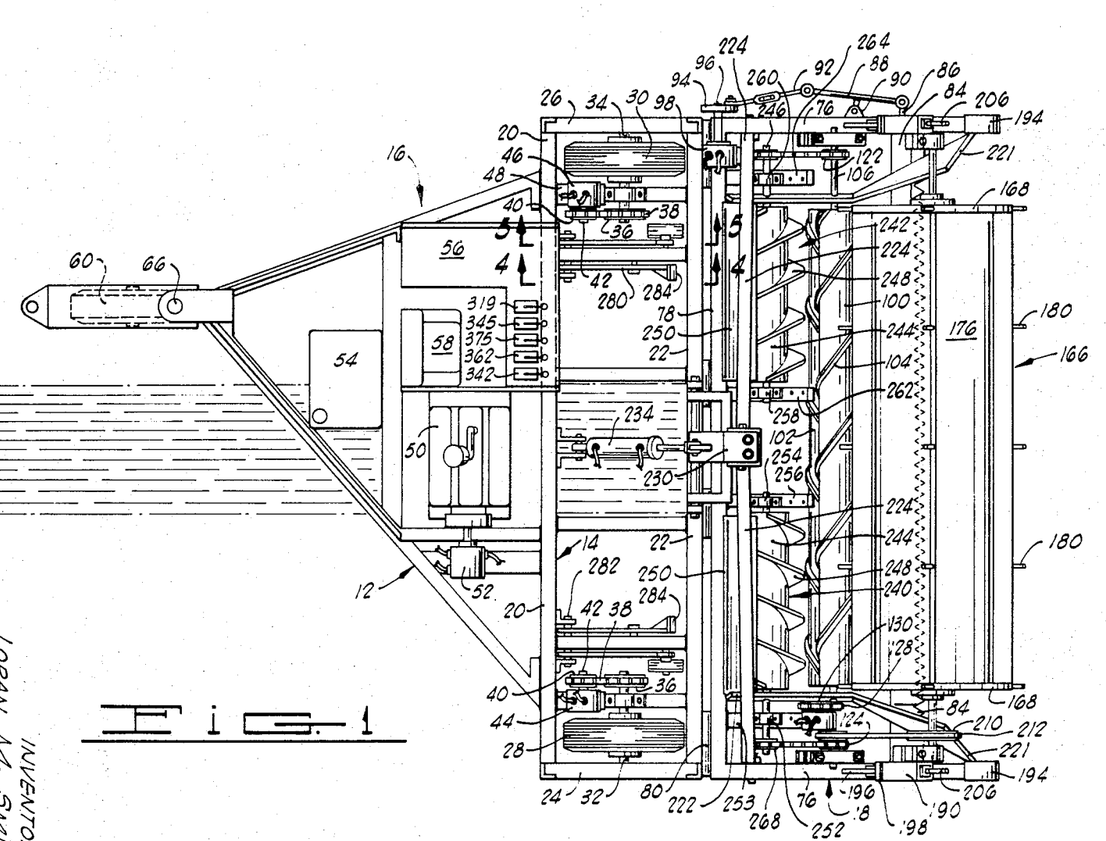
FIG. 1 is a top plan view of one embodiment of the hay swather of the present invention.

Referring to the drawings, and specifically to FIG. 1, the hay swather of the present invention is generally designated by reference numeral 12 and includes a transverse main frame 14 of substantially right parallelepiped or box-like configuration and a rearwardly extending frame generally of triangular configuration designated generally by reference numeral 16. The swather 12 further includes a forwardly extending frame generally designated by the reference numeral 18. The main frame 14 includes rear upper and lower transverse beams 20, upper and lower forward transverse beams 22, and outside longitudinal beams 24, 25, 26, and 27.

A pair of supporting and driving ground engaging wheels 28 and 30 are mounted at opposite sides of the main frame 14 on suitable axles 32 and 34. Each of the axles 32 and 34 has keyed thereto a suitable sprocket gear 36, and each of these sprocket gears is driven by a chain 38 which encircles a drive gear 40 keyed to the output shaft 42 of a hydraulic motor. The hydraulic motors which drive the respective ground engaging wheels 28 and 30 are designated by reference numerals 44 and 46, respectively. The hydraulic motors 44 and 46 are mounted on support plates 48 secured to the main frame 14.

As hydraulic fluid under pressure passes through the hydraulic motors 44 and 46 from and to conduits hereinafter described, these motors will correspondingly drive the ground engaging wheels 28 and 30 to which they are drivingly connected. The motors 44 and 46 are separately controlled or individually driven to afford effective steering control, and are also reversible for the purpose of either moving the hay swather in a reverse direction or for using the reversing action of the motors as retarding brakes.

For the purpose of supplying hydraulic fluid to the various hydraulic motors utilized in the hay swathing apparatus, there is provided an internal combustion engine 50 of any suitable type which is mounted on the rearwardly extending frame 16. The internal combustion engine 50 is drivingly connected to a hydraulic pump 52 mounted on the rearwardly extending frame 12, and this pump draws hydraulic fluid from a hydraulic fluid reservoir 54, also mounted on the rearwardly extending frame 16. An operator's platform 56 is mounted just rearwardly of the main frame 14 on the rearwardly extending frame 16 and has an operator's seat 58 supported thereon. The various controls used by the operator in controlling the hydraulic system used in the hay swithing apparatus are located directly ahead of the operator's seat 56, and will be described in greater detail hereinafter when reference is made to FIG. 10.

At the rear of the triangular rearwardly extending frame 16, there is mounted a castering wheel 60 which is rotatably journaled between the legs of an inverted U-shaped yoke 62 which has a forwardly projecting portion 64 pivotally connected to the rear end of the triangular rearwardly extending frame 16 by a pivot bolt or pin 66. Extending rearwardly from the yoke 62 is a tongue 68 having a clevis 70 at the rear end thereof for receiving a pin 72 by which the swather may be towed by connection with a suitable towing vehicle, such as a pickup truck or the like. A reinforcing member 74 interconnects the tongue 68 and the yoke 62 for reinforcing this part of the hay swather apparatus.

Figure 8:
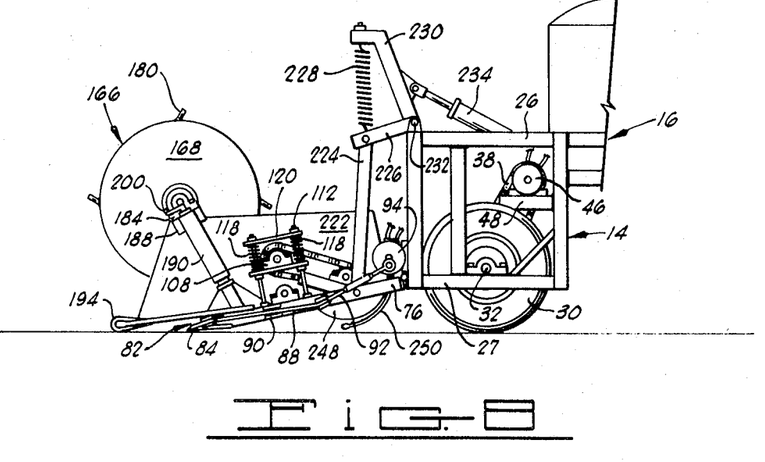
FIG. 8 is a partial side elevational view showing in elevation, the forward portion of the hay swather apparatus on the opposite side of the apparatus from that depicted in FIG. 3.

The forwardly extending frame 18 includes a pair of side rails 76 rigidly connected to transverse beams 78 which are hingedly connected to the main frame 14 by a hinge structure 80 to enable the forwardly extending frame to raise and lower about a transverse axis. Mounted between the forward ends of the side rails 76 of the forwardly extending frame 18 is a cutter bar assembly designated generally by reference numeral 82. The cutter bar assembly 82 is in the form conventionally used on hay swathers, combines, and the like and includes the usual reciprocating blade or knife 84. A link 86 is pivotally connected to one end of the reciprocating blade 84, and the outer end of this link is pivotally connected to a rocker bar 88 which is pivotally supported from one of the side rails 76 by a bracket assembly 90. The other end of the rocker bar 88 is pivotally connected to an elongated rod or bar in the form of an adjustable length pitman arm 92. The pitman arm 92 is eccentrically connected to the outer peripheral portion of a plate 94 as best illustrated in FIGS. 1 and 8. The plate 94 is keyed to the output shaft 96 of a hydraulic motor 98 which is mounted on one of the transverse beams 78 of the forwardly extending frame 18.

Figures 2, 6, 7:
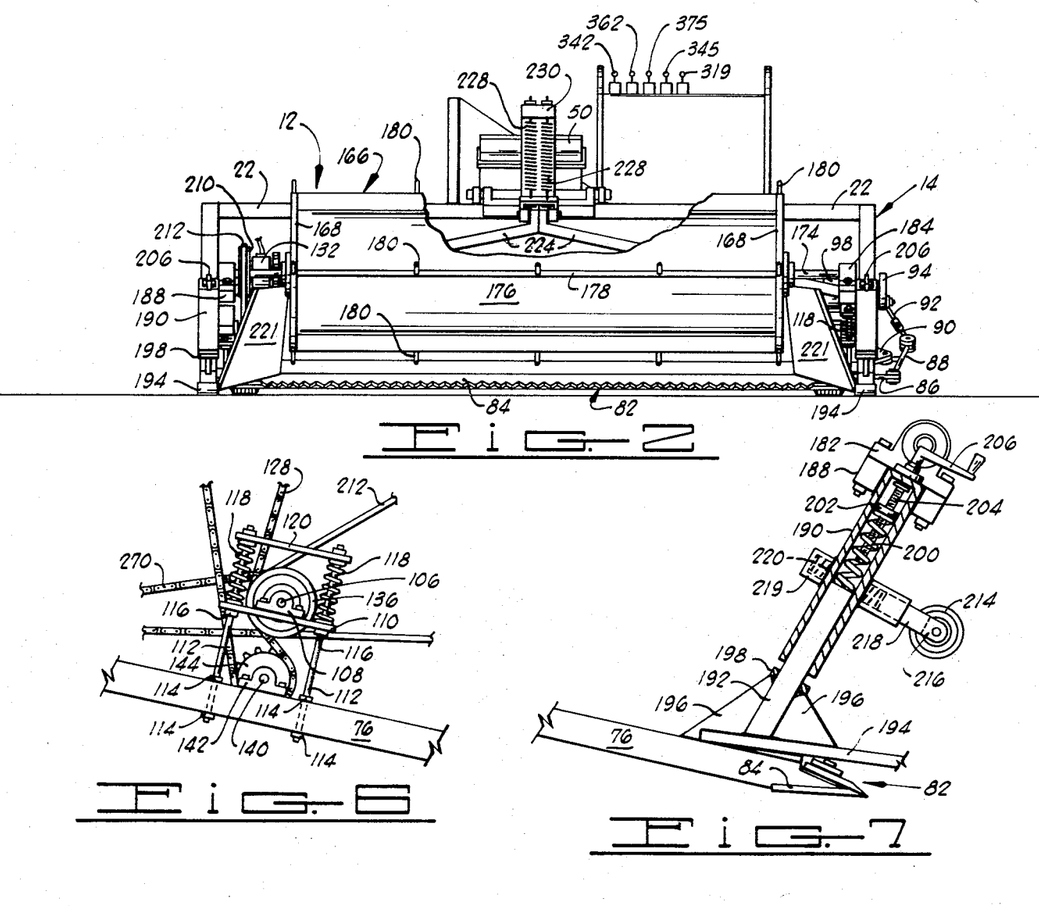
FIG. 2 is a front elevation view of the hay swather depicted in FIG. 1 with a portion of the reel assembly broken away for clarity of illustration.
FIG. 6 is a fragmental detail view of the mounting arrangement and a part of the drive system used for supporting and driving the conditioning rollers used in the hay swather machine of the invention.
FIG. 7 is a fragmental detail view illustrating the adjusting mechanism utilized for adjusting the position of the reel assembly of the hay swather apparatus, and for maintaining the drive belt to the reel assembly in tension.

Mounted on the forwardly extending frame 18 behind the cutter bar assembly 82 is a pair of conditioning rollers 100 and 102. Each of the conditioning rollers 100 and 102 has a spiral rib 104 around the periphery thereof for the purpose of crushing the hay, and especially the stems thereof, as it passes between the conditioning rollers. The conditioning rollers 100 and 102 have axles or shafts extending therethrough which are mounted on the forwardly extending frame 18 for rotation about horziontal axes. Thus, the upper conditioning roller 100 is carried on a shaft 106 which extends at its oppoiste ends into journal blocks 108 of the type best shown in FIGS. 3 and 6. The journal blocks 108 are each bolted to a support plate 110 which is movably mounted on a pair of guide rods 112. The guide rods 112 are adjustably secured to one of the side rails 76 by means of pairs of nuts 114 threaded thereon, and each of the guide rods carries a positive stop nut 116 which limits the distance along the guide rods which the respective support plate 110 can slide. Each of the support plates 110 is engaged by a pair of compression springs 118 which encircles the rods 112 and bear at their upper ends against an adjustable top plate 120 so that the support plate 11 is spring loaded toward the stop nuts 116, or alternatively, and in certain positions, is spring biased in a way such that the upper conditioning roller 100 is resiliently biased against the lower conditioning roller 102.

Keyed to the shaft 106 adjacent one end of the conditioning roller 104 is a sprocket 122. Adjacent the other end of the shaft 106 is a sprocket 124. Located inwardly of the sprocket 124 on the shaft 106 is a sprocket 126 (see FIGS. 1, 6, and 10). The sprocket 126 is driven by a chain 128 which extends around a sprocket 130 keyed to a shaft 131 which is the output shaft of a hydraulic motor 132 which is mounted in any suitable way on the forwardly extending frame 18. The shaft 106 also has keyed thereto in a location between the sprocket 124 and the sprocket 126, a pulley 136 (see FIGS. 1 and 10). The lower conditioning roller 102 is mounted upon, and rotatable with, an elongated shaft 140 which is journaled at its opposite ends in a pair of journal blocks 142 secured to the respective side rails 76. Positioned in alignment with the sprocket 126 carried on the shaft 106 on the upper conditioning roller 100 is a sprocket 144 which is keyed to the shaft 140 inwardly of the bearing block 142.

As illustrated by this arrangement, as the hydraulic motor 132 is actuated, the chain 128 is driven by the sprocket 130 and, in passing over the back side of the sprocket 126 and over the front side of the sprocket 144, effectively drives the conditioning rollers 100 and 102 in opposite directions with respect to each other so that the hay is pulled between the rollers 100 and 102 and discharged rearwardly thereof.

Figure 9:
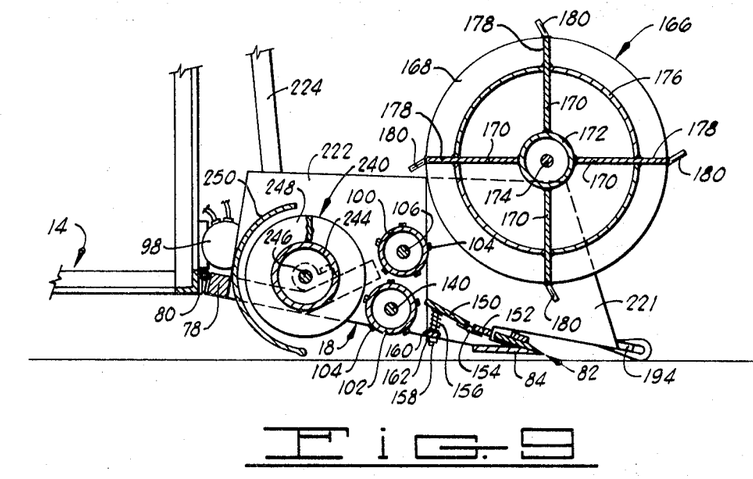
FIG. 9 is a fragmental detailed, partially sectional view illustrating the relationship between the reel, the cutter bar, the conditioning rollers, and one of the augers used in the apparatus of the invention.

Extending forwardly and in a downwadrly inclined direction from the conditioning rollers 100 and 102 is a feed plate 150 (see FIG. 9). The feed plate 150 has its rear edge adjacent the upper portion of the lower conditioning roller 102, and has its forward edge hingedly connected to a guide plate or deflector plate 152 by means of a transversely extending hinge 154. The feed plate 150 can thus pivot about a horizontal axis so that its rear edge adjacent the conditioning rollers 100, 102 can be raised or lowered. Lowering of the feed plate 150 is resiliently resisted by a spring 156 which surrounds a bolt 158 passed through a transverse member 160 and adjustably secured thereto by an adjusting nut 162. It will be seen that it is possible by adjustment of the position of the bolt 158 with respect to the transverse member 160 to adjust the inclination of the feed plate 150 and the position of its rear edge in relation to the space between the conditioning rolls 100 and 102. It will also be noted that the guide or deflector plate 152 has its forward edge located immediately adjacent the cutter blade 84 so that cut hay passes directly from the cutter blade onto the guide plate 152, and from the guide plate, passes onto the feed plate 150.

For moving hay toward and into the cutter bar assembly 82, there is provided a reel assembly designated generally by reference numeral 166. The reel assembly 166 includes a pair of circular end plates 168 interconnected by four radially extending transverse plates 170 (see FIG. 9) which are connected at their inner ends to a central drum 172 mounted on a supporting shaft 174. The transverse plates 170 are secured to the end edges of four quadrant plates 176 which collectively form a cylinder. The end portions of the plates 170 form a plurality of wiping flanges 178 projecting radially outwardly from the quadrant plates 176. Secured to the outer edges of the wiping flanges 178 and spaced along the transverse width thereof are a plurality of fingers 180 which are inclined at an angle of about 45° with respect to the plane of the wiping flanges 178, and away from this plane in the sense of the direction of rotation of the reel assembly 166. In other words, the fingers 180 lean, or are inclined away, from the direction of rotation of the reel so that hay will be stripped from these tines as the reel assembly 166 rotates in the direction indicated by the arrow on FIG. 3.

The reel assembly 166 is mounted for rotation on the forwardly extending framework 18 by supporting the opposite ends of the shaft 175 in suitable bearing structures 182 and 184 disposed at opposite sides of the frame 18. The bearing structures 182 and 184 are mounted on supporting blocks 186 and 188 which are welded or otherwise suitably secured to the inside of a pair of tubular support members 190. The tubular support members 190 are located on opposite sides of the forwardly extending framework 18, and are telescoped over an upwardly projecting supporting post 192 which is secured at its lower end to the respective side rail 76. Secured across the posts 192 and to the side rails 76 at opposite sides of the forwardly extending framework 18 are a pair of forwardly extending skids or runners 194 which, in a conventional manner, engage the ground surface for serving as depth control devices to control the level of the cutter bar assembly 82 with respect to the ground. Further support and reinforcement for the posts 192 are provided by angle plates 196 secured between these posts and the respective skids 194. It will be noted that an annular stop collar 198 is secured around each of the posts 192 intermediate the ends of the posts. The stop collars 198 function to limit the downward movement of the tubular members 190 on the posts 192 at times during the operation of the machine as hereinafter described.

Positioned within each tubular member 190 between the closed upper end of the tubular member and the end of the respective posts 192 within the tubular member is a helical compression spring 200. The lower end of the helical compression spring 200 bears against the upper end of the respective post 192 and the upper end of the helical compression spring bears against an adjusting nut 202 which threadedly engages the elongated threaded shaft of an adjusting screw 204. The adjusting screw 204 projects through the closed upper end of the tubular member 190 and carries at its outer end an adjusting handle 206. The adjusting nut 202 has a polygonal external periphery which prevents it from rotating within the tubular member 190, but which permits it to slide in an axial direction within the tubular member 190. Thus, rotation of the shaft of the threaded adjusting screw 204 will cause reciprocating movement of the adjusting nut within the tubular member 190, and will tend to vary the compression of the spring 200. The tubular member 190 reacts to this variation in compression by reciprocating axially upon the respective posts 192. In this manner, it is possible to selectively adjust the relative height above the ground of the reel assembly 166 in accordance with crop conditions, condition of the terrain, etc.

Figure 3:
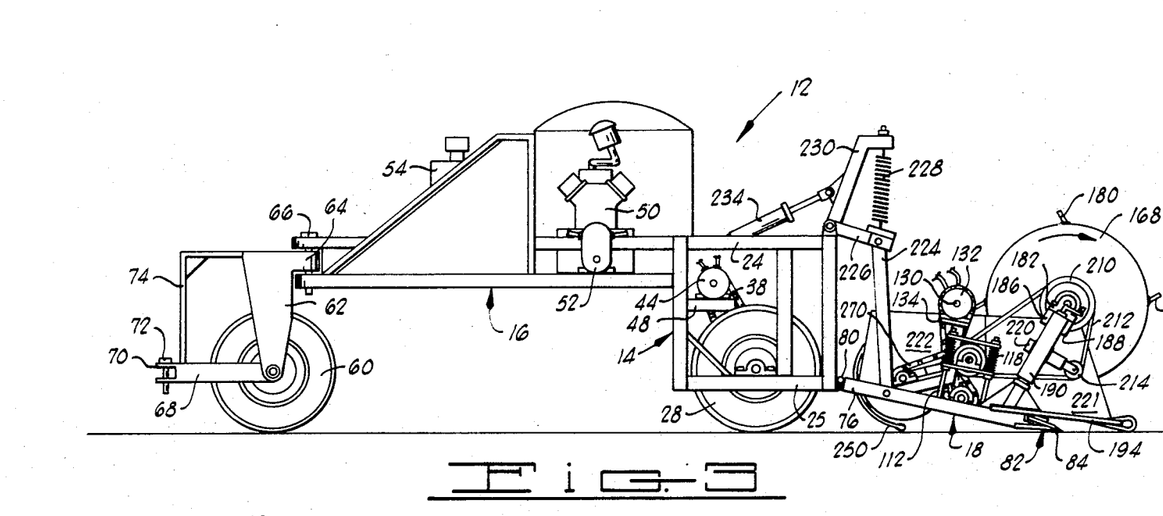
FIG. 3 is a side elevational view of the hay swather with parts broken away to more clearly illustrate portions of the invention.

For the purpose of driving the reel assembly 166 in rotation, one end of the shaft 174 has keyed thereto a drive pulley 210 as best illustrated in FIG. 3. A drive belt 212 is passed around the drive pulley 210 and around the pulley 136 on the shaft 106 of the upper conditioning roller 100 so that when the upper conditioner roller 100 is rotated in a clockwise direction as viewed in FIG. 6, the reel assembly 166 is also rotated in a clockwise direction as it is viewed in FIGS. 3 and 9. For the purpose of maintaining the drive belt 212 taut, an idler pulley 214 is rotatably mounted in a clevice 216 carried at the outer end of a rod 218 which is telescoped within a sleeve 219 welded or otherwise suitably secured to an intermediate portion of the tubular member 190. A spring 220 is carried within the sleeve 219 and, in extending between the closed end of the sleeve and the internal end of the rod 218, constantly biases the rod in an outward direction with respect to the sleeve so that the idler pulley 214 is continuously forced against the drive belt 212. A suitable keyway and retention key (not shown) are provided in the rod 218 and on the interior of the sleeve 219, respectively, to prevent the rod 218 from being ejected from the sleeve 219 at such time as the drive belt 212 might be removed for repairs, replacement, etc. It will be noted that though the tubular member 190 is free to move upwardly and downwardly upon the post 192, this movement does not significantly affect tension in the drive belt 212 since the angulation of this belt with respect to the idler pulley 214 is maintained, even though the idler pulley may shift upwardly or downwardly to some extent.

For the purpose of defining a swath to be cut by the cutter bar assembly 82 and for leading the hay inwardly to the cutter blade 84 and to the reel assembly 166, a pair of vertically extending, inwardly converging swath plates 221 are secured to the skids 194 and to the forward ends of guide plates 222 which are located on opposite sides of the framework, and are supported on the forwardly extending frame 18 in any suitable manner.

A structure is provided for elevating the forwardly extending frame 18 which will concurrently elevate the cutter bar assembly 82, the conditioning rollers 100 and 102 and the reel assembly 166 to provide for transport of the swather, and to provide for elevation adjustment in the height of cutting of the hay. This structure includes a pair of lift links 224 which together form an inverted, shallow U-shaped yoke as illustrtted in FIG. 2. The links 224 are connected with a link 226 which is pivotally connected to the transverse main frame 14 at about the center of the transverse beam 22 of the main frame. The lower ends of the lift links 224 are secured to the side rails 76 so that the link 226 and the lift links 224 form a parallelogram type of linkage.

Coil springs 228 are connected to the inner ends of the lift links 224 and extend upwardly to an angulated lift member 230 which has the lower end thereof pivotally attached to the transverse beam 22 of the main frame 14 in alignment with the pivotal connection of the link 226 as indicated by reference numeral 232. A fluid pressure piston and cylinder assembly, such as a hydraulic ram 234, is connected to the angulated lift member 230 and to the main frame 14 in a suitable manner to enable swinging movement of the lift member 230 in a vertical plane which will raise and lower the forwardly extending frame 18. The springs 228 resiliently support the forwardly extending frame 18 for enabling resilient movement thereof.

Carried on the forwardly extending frame 18 to the rear of the conditioner rollers 100 and 102 are a pair of auger conveyor assemblies designated generally by reference numerals 240 and 242. Each of the auger conveyor assemblies 240 and 242 includes a central drum 244 which is mounted upon a shaft 246 and has secured thereabout a helical blade 248. It will be noted in referring to FIG. 1 that the blades 248 of the two auger assemblies 240 and 242 are oppositely turned so that hay is moved axially along the two auger assemblies in opposite directions, i.e., toward the center of the hay swathing apparatus. Each of the auger conveyor assemblies 240 and 242 further includes a semicylindrical guide palte 250 positioned to the rear of the respective auger assembly, and spaced slightly from the helically turned blade 248 of each of the auger assemblies.

Each auger assembly 240 and 242 is rotatably mounted on the forwardly extending frame 18 by extending the respective shafts 246 through bearing blocks located at opposite ends of the respective auger assemblies. Thus, the shaft 246 of the auger assembly 240 extends through a betring block 252 which is detachably secured to the upper side of a forwardly extending, cantilevered beam 253, and also through a bearing block 254 which is detachably secured to the upper side of a forwardly extending cantilevered beam 256. The cantilevered beams 253 and 256 are supported on the forwardly extending framework 18. In like manner, the shaft 246 of the auger conveyor assembly 242 is extended through bearing blocks 258 and 260 which are supported on cantilevered beams 262 and 264 carried by the forwardly extending frame 18.

It will be noted that at the outer ends of each of the shafts 246 of the two auger conveyor assemblies 240 and 242, each shaft has keyed thereto a drive sprocket 268. Drive chains 270 extend from the two sprockets 124 and 122 keyed to opposite ends of the shaft 106 of the upper conditioner roller 100 to the two sprockets 268 carried at the outside ends of the two shafts 246 of the two auger conveyor assemblies 240 and 242 so that the auger conveyors are drivingly interconnected through the upper conditioner roller 100 to the hydraulic motor 132. It will be seen from the foregoing description that the hydraulic motor 132 thus directly drives the conditioner rollers 100 and 102 through the chain 130, and that as the upper conditioner roller 100 is driven in rotation, this drives the reel assembly 166 through the belt 212 and drives the auger conveyor assemblies 240 and 242 through the drive chains 270.

Figure 11:
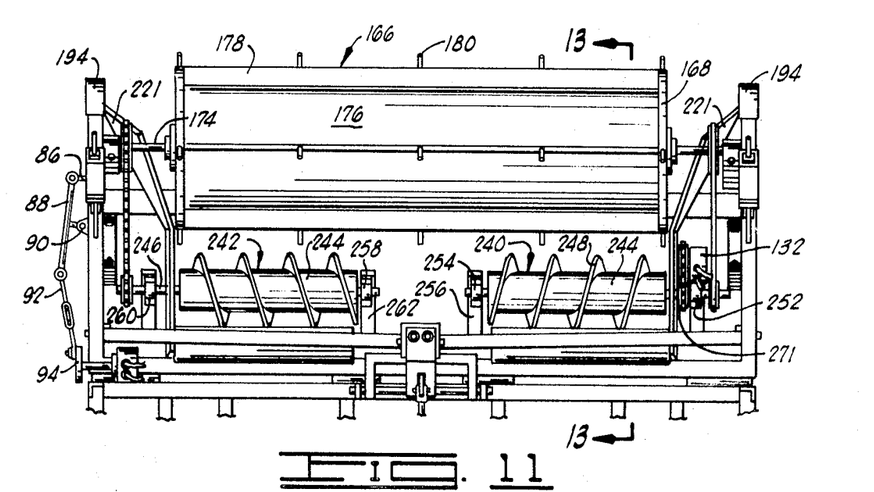
FIG. 11 is a fragmentary top plan view showing a portion of the apparatus depicted in FIG. 1, but portraying an alternate arrangement of the apparatus.
Figure 12:
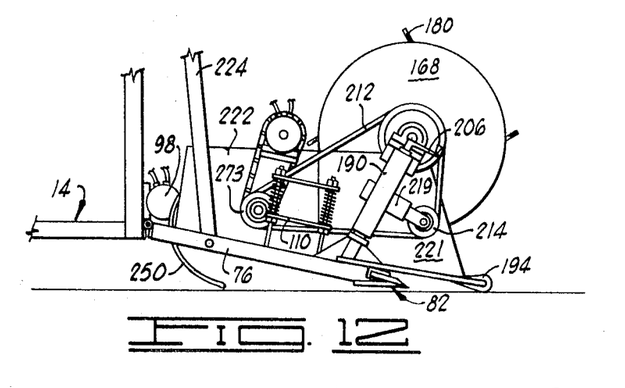
FIG. 12 is a fragmental, detailed view illustrating in elevation from one side, a portion of the apparatus in the alternate position shown in FIG. 11.
Figure 13:
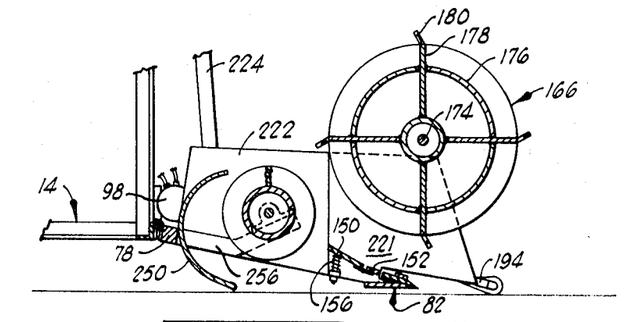
FIG. 13 is a fragmental, detailed, partially sectional view taken along line 13—13 of FIG. 11.

In the cutting and windrowing of some types of hay or grain crops, it is deirsable to use only the auger conveyor assemblies 240 and 242 which are, in this instance, located immediately behind the feed plate 150 after the conditioner rollers 100 and 102 are removed from the apparatus. In this usage, the bearing blocks 252, 254, 258, and 260 can be detached from their illustrated positions and move forwardly on the cantilevered beams 253, 256, 262, and 264. This arrangement is illustrated in FIGS. 11–13. When they are re-secured to the beams adjacent the forward ends thereof, the leading edge of the helical blades 248 carried by the auger conveyor assemblies 240 and 242 are then positioned at a location which is approximately the location occupied by the forward side of the conditioner rollers 100 and 102 when they are utilized. In the case of such relocation of the auger conveyor assemblies 240 and 242, it will then be necessary to affix a sprocket 271 to the respective shafts 246 thereof so that the auger conveyors can be driven directly from the hydraulic motor 132. It is also then necessary to provide a pulley 273 on the shaft of the auger conveyor assembly 240 to drive the conditioner reel. Keying of such sprockets and pulley to the outer ends of the shafts as required is, however, easily accomplished.

From the description thus far, it will be apparent that the operator of the swather apparatus of the invention will control the hydraulic motors 44 and 46 which are drivingly connected to the ground engaging wheels 28 and 30 so that the swather is propelled forwardly for cutting and windrowing hay. The cutter blade 84 is actuated, the reel assembly 166 is caused to rotate, and the conditioner rollers 100 and 102 are driven so that hay is cut by the cutter blade, conditioned by passage through the conditioner rollers 100 and 102, and is placed in a windrow by being moved inwardly by the cooperating action of the auger conveyor assemblies 240 and 242. The vertical position of the cutter bar assembly 82, the reel assembly 166, the conditioning rollers 100 and 102, and the auger conveyor assemblies 240 and 242 may be varied by the use of the hydraulic ram 234 for variation in the cutting height, and also to enable maneuvering of the swather apparatus, such as at the end of a field or for travel over the road for relatively short distances. When it is desired to pull the swathing apparatus over the road for a substantial distance, it is desirable to elevate the apparatus so that the ground engaging, driving wheels 28 and 30 are not in engagement with the surface of the supporting road. The structure for accomplishing this is a pair of lift members 280 pivotally mounted by a pivot pin 282 to the main frame 14 in the manner best illustrated in FIG. 4. At their ends opposite the end pivotally connected to the main frame 14, the lift members 280 carry a foot plate 284. Normally, the lift members 280 are retained in an elevated horizontal position as illustrated in full lines in FIG. 4, but when it is desired to drop the lift members preparatory to placing the swather apparatus in an over-the-road transport status, a lock pin 286 used to maintain the lift members 280 in an elevated, horizontal position is removed so that the lift members may be dropped downwardly. Then, by forward movement of the swather apparatus by using a towing vehicle, the lift members 280 can be pivoted to a substantially vertical position as illustrated by dashed lines in FIG. 4, thus elevating the drive wheels 28 and 30 off of the supporting surface. An additional lock pin 288 may be provided if desired for locking the lift members 280 in the vertically extending, lifting position when it is desired to store the swather apparatus for any length of time, thereby taking the weight of the apparatus off the ground engaging wheels 28 and 30.

Figure 5:
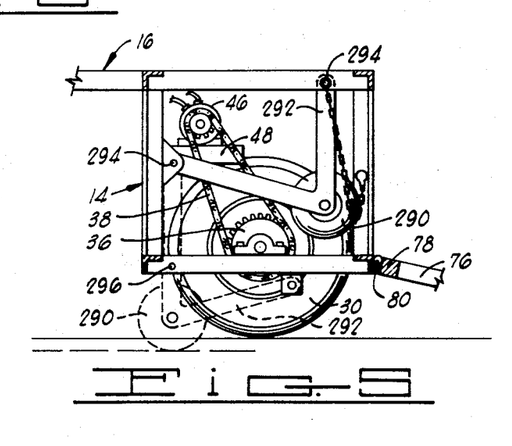
FIG. 5 is a fragmental detail sectional view taken along line 5—5 of FIG. 1 illustrating the lowerable transport wheels in their inoperative position. The operative position of the transport wheels is illustrated in dashed lines.

FIG. 5 illustrates structure further enabling the swather apparatus of the invention to be transported substantial distances without the use of the ground engaging wheels 28 and 30. There is here illustrated a transport wheel 290 constituting one of a pair of such wheels mounted on the main framework 14. The transport wheels 290 are each pivotally secured to the angle of an L-shaped mounting bracket 292 which is pivotally connected at one end to the framework 14 by means of a pivot pin 294. The opposite end of the L-shaped mounting bracket 292 is secured to the upper side of the main framework 14 by means of a lock pin 294. The lock pin 294 retains the transport wheels 290 and the L-shaped mounting brackets 292 which carry them in an upwardly raised in operative position as shown in full lines in FIG. 5. When the transport wheels 290 are lowered to a transporting position (as shown in dashed lines) by releasing the lock pins 294, they are retained in the transport position, either by the same lock pin, or by an additional lock pin 296, which is extended into a lower portion of the framework 14. The lock pins 294 and 296 are preferably of the type which are positively retained in position by the use of a suitable keeper on one end thereof.

Figure 10:
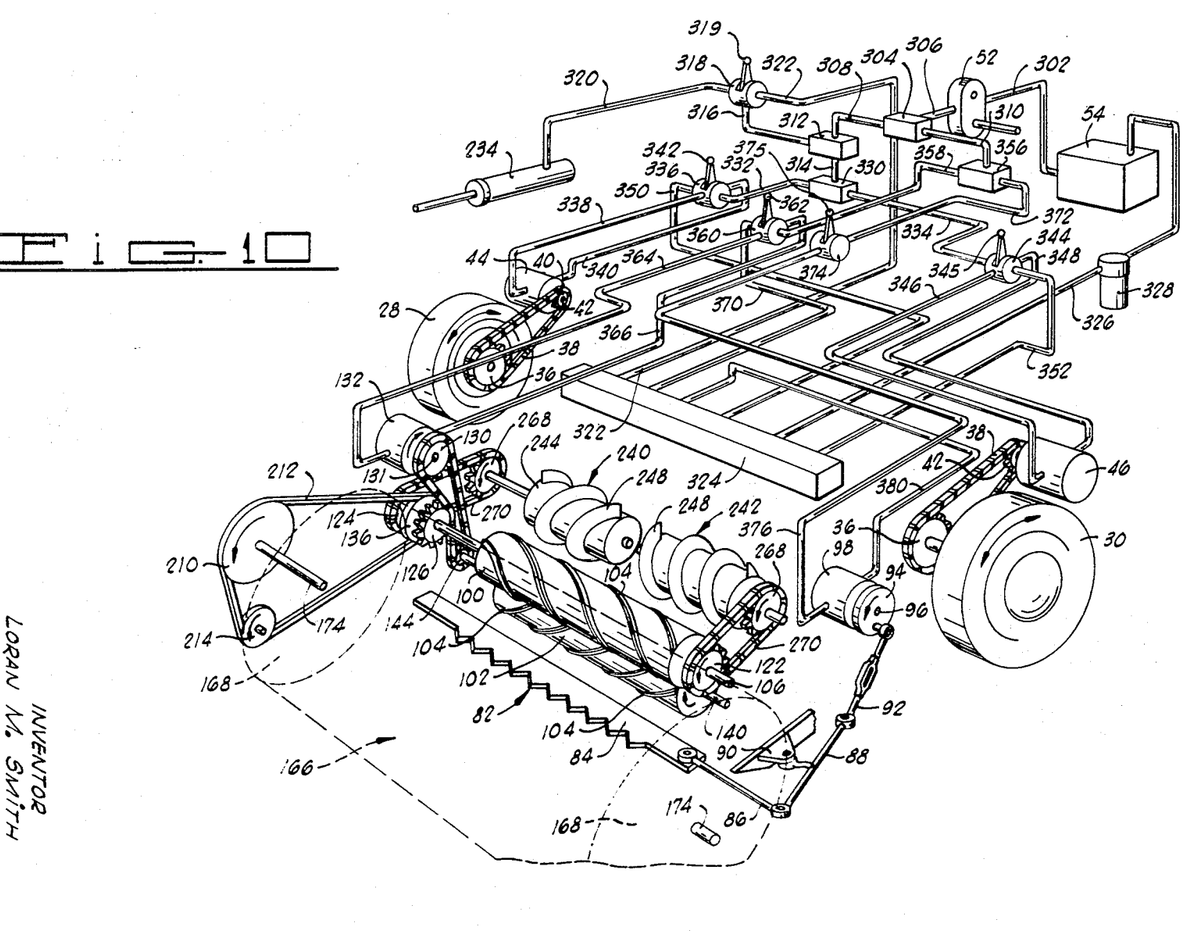
FIG. 10 is a diagrammatic illustration of the hydraulic system utilized for driving the drive wheels on the hay swather apparatus, and for driving the cutter bar, conditioning rollers, reel, and augers.

FIG. 10 is a perspective schematic illustration of the hydraulic system utilized for driving certain structural elements of the hay swather apparatus of the invention. As has been previously indicated, there are provided a hydraulic motor 44 which is utilized for driving one of the ground engaging wheels 28 in either direction of rotation, a hydraulic motor 46 which is utilized for driving the other ground engaging wheel 30 in either direction of rotation, a hydraulic motor 132 which is utilized for driving the auger conveyor assemblies 240 and 242, the conditioner rollers 100 and 102, and the reel assembly 156, and finally, the hydraulic motor 98 which is utilized for driving the cutter bar assembly 82. The hydraulic system further includes the hydraulic pump 52 which is driven by the engine 50 and which draws hydraulic fluid from the reservoir 54 via a conduit 302. From the hydraulic pump 52, the fluid is passed through a conduit 306 to a fluid flow divider fitting 304 which divides the fluid introduced thereto from the conduit 306 so that it is discharged in equal amounts into the conduits 308 and 310. In other words, the flow divider fitting 304 effects a 50-50 ratio equal division of the hydraulic fluid charged thereto, and discharges equal amounts of hydraulic fluid into the conduits 308 and 310.

Hydraulic fluid from the conduit 308 enters another flow divider fitting 312 where the fluid flow is divided on a 90-10 ratio, with 90 percent of the introduced fluid being discharged through the conduit 314, and 10 percent of the charged fluid being discharged through the conduit 316 to a control valve 318. The control valve 318 has a hand control lever 319 and is constructed to direct hydraulic fluid through a conduit 320 to the cylinder of the hydraulic ram 234 for the purpose of retracting the piston of this ram to raise the forwardly extending frame 18 as hereinbefore described. When the control valve 318 is shifted in an alternate direction, fluid may be discharged from the cylinder of the ram 234 through the valve 318 to the conduit 322 for ultimate return through a manifold 324 and conduit 326, first to a filter 328, and then to the reservoir 54.

The hydraulic fluid which is directed into the conduit 314 by the flow divider fitting 312 is divided by another flow divider fitting 330 in a 50-50 ratio with half of the charged fluid being discharged into a conduit 332 and half being discharged into a conduit 334. Fluid from the conduit 332 passes to a control valve 336, which is a valve constructed to permit hydraulic fluid to be directed to the hydraulic motor 44 either through the conduit 338 or the conduit 340, depending upon whether it is desired to drive the ground engaging wheel 28 in a forward direction or in a reverse direction. In other words, the control valve 336 permits forward or reverse control of the hydraulic motor 44 and of the ground engaging wheel 28 which is drivingly connected thereto. The control valve construction also permits the speed in either of these directions to be varied by the extent to which the operator's lever 342 is pivoted either toward the front of the swather apparatus or toward the rear thereof.

In similar fashion, the control valve 344 having control lever 345 receives hydraulic fluid from the conduit 334 and functions to direct the fluid to the hydraulic motor 46, either through the conduit 346 or through the conduit 348. It may be observed that at such time as one of the pairs of conduits extending from each of the control valves 342 and 344 to the respective hydraulic motor 44 or 46 is in use as a charging conduit to the resective motor, the other of the two pairs of conduits functions as a return line returning hydraulic fluid from the respective motor to the control valve. The returned fluid is then discharged, in the case of the control valve 336, through a conduit 350 to the manifold 324, and ultimately is returned through the conduit 326 and filter 328 to the reservoir 54. In similar manner, hydraulic fluid returned to the control valve 344 by either the conduit 346 or 348 passes through the valve and enters the discharge conduit 352 and is returned by this conduit to the manifold 324 for ultimate return through the filter 328 to the reservoir 54.

That portion of the hydraulic fluid delivered by the pump 52 to the flow divider fitting 304 by way of the conduit 306 which is discharged from this fitting into the conduit 310 passes to a flow divider fitting 356 which effects an equal division of the hydraulic fluid, and is thus a 50-50 ratio flow divider. That portion of the hydraulic fluid which is discharged from the flow divider fitting 356 into the conduit 358 passes from this conduit to a control valve 360 which is similar in construction to the control valves 336 and 344 and carries operating lever 362. The control valve 360 is constructed so that fluid may be selectively directed through this valve to either a conduit 364 or to a conduit 366, both of which conduits are connected to the hydraulic motor 132. Thus, the control valve 360 can be used to drive the hydraulic motor 132 in either direction and at a variable speed. Therefore, the auger conveyor assemblies 240 and 242, conditioner rollers 100 and 102, and reel assembly 166 can be driven in either direction of rotation although usually only one direction of rotation will be employed for these elements unless reversal is desirable to clear choking or a blockage or the like.

Hydraulic fluid returned to the control valve 360 from one of the conduits 364 or 366 is discharged through this valve into the conduit 370 and flows through the latter conduit to the manifold 324 from which the fluid may be returned to the reservoir 54 in the manner hereinbefore described.

A portion of hydraulic fluid equivalent to the amount of fluid directed into the conduit 358 from the flow divider fitting 356 is also directed from this fitting into a conduit 372. Connected to the conduit 372 is a control valve 374. The control valve 374 is of more simple construction than the control valves hereinbefore described since its function is merely to control the flow of hydraulic fluid to the hydraulic motor 98 which drives the cutter bar assembly 82, and there is no need for a reversal of direction in which the cutter blade is reciprocated. Thus, the control valve 374 merely functions to control the rate of flow of hydraulic fluid into the conduit 376 which carries the fluid to the hydraulic motor 98 utilized for driving the cutter bar assembly 82 through the linkage hereinbefore described. The fluid is discharged from the hydraulic motor 98 through a conduit 380 to the manifold 324, and is ultimately returned to the reservoir 54 in the manner which has been described.

OPERATION

In the operation of the hay swathing machine of the invention, the machine is operated, of course, by an operator seated upon the operator's seat 58 and utilizing the control levers 319, 345, 375, 362, and 342 for controlling the ram 234 and the various hydraulic motors included in the apparatus. When the apparatus is in the field ready for use in cutting, conditioning, and windrowing hay, it rests upon the ground engaging wheels 28 and 30 and the caster wheel 60. Prior to commencing the cutting of the hay, adjustments are made in the positions of the reel assembly 166, the guide and feed plates 152 and 150, respectively, the condtioner rollers 100 and 102, and the auger conveyor assemblies 240 and 242, as may be desired or necessary to achieve maximum effectiveness, considering the particular type of crop which is to be cut and the terrain to be traversed. Moreover, the entire mechanism mounted on the forwardly extending frame 18 can be raised or lowered by the use of the hydraulic ram 234 which is controlled by the control lever 319 in a manner hereinafter described in greater detail.

With respect to necessary or desirable adjustments in the described components which directly act upon the hay, the reel assembly 166 may be raised or lowered with respect to the ground, and with respect to the cutter bar assembly 82 by utilizing the hand cranks 206. As these cranks are rotated, the nuts 202 are caused to reciprocate within the respective tubular members 190. It will be apparent in referring to FIG. 7 that downward movement of the nut 202 has the effect of forcing the tubular member 190 outwardly on the post 192, and in this manner raising the reel assembly 166 with respect to the cutter bar assembly 82 and with respect to the ground.

It may also be desirable to adjust the inclination and height of the trailing edge of the feed plate 150 over which the cut hay is passed to the conditioner rollers 100 and 102. This is accomplished by threading the nuts 162 further upon the bolts 158 in order to lower the trailing edge of the feed plate 150, or threading these nuts outwardly on the bolts if it is desired to raise the trailing edge of the feed plate and increase its inclination. Usually, adjustments of the inclination of the feed plate 150 will be made conjunctively with an adjustment of the position, in relation to each other, of the conditioner rollers 100 and 102. These rollers are concurrently adjusted by changing the position of the rods 112 shown in FIG. 6 in relation to the side rails 76. Thus, the upper and lower conditioner rollers 100 and 102 can be lowered by extending the rods 112 a further distance through the side rails 76. Also, the extent to which the upper conditioner roller 100 may yield to masses of hay passing therethrough may be adjusted by adjustment of the nuts 116 upwardly or downwardly on the rods 112 so as to increase or decrease the force exerted by the springs 118. This adjustment also varies the spacing between the two rollers.

As has been previously explained, it will, in some instances, be desirable to completely remove the conditioner rollers 100 and 102, and to move the auger conveyor assemblies 240 and 242 forwardly to a position where the leading edges of the blades 248 carried thereby are in the positions formerly occupied by the forward side of the conditioner rollers. This may be accomplished by moving the bearing blocks 252, 254, 258 and 260 (see FIG. 1) forwardly on the supporting members 256 and 262 from the illustrated positions to a position near the forward ends of the supporting members. Alternate bolt holes are provided on the supporting members so that this advance of the auger conveyor assemblies 240 and 242 toward the forward end of the hay swather machine 12 can be accomplished.

Having made the necessary or desirable adjustments in the positions of the reel assembly 166, the feed plate 150, the conditioner rollers 100 and 102, and the auger conveyor assemblies 240 and 242, the hay swather machine is then driven forwardly by driving the ground engaging wheels 28 and 30 in rotation in a forward direction. This is accomplished by the operator's manipulation of the operating levers 342 and 345. As either of these operating levers is moved forwardly, hydraulic fluid is permitted to pass through the respective valve 336 or 344 into the respective conduit 338 or 346. This results in hydraulic power fluid being delivered to one or both of the hydraulic motors 44 and 46 in a direction such that the associated ground engaging wheel 28 or 30 is driven in a forward direction of rotation. The speed at which the ground engaging wheels are driven is determined by the extent to which the operating levers 342 and 345 are moved in the forward direction.

If it should be desired to reverse one or both of the ground engaging wheels 28 and 30, either for the purpose of making a sharp turn, or for the purpose of braking the hay swathing machine, or for the purpose of moving in reverse, this is accomplished by moving the respective operating levers 342 and 345 rearwardly so as to reverse the direction of fluid flow through the hydraulic motors 44 and 46. In other words, when the operating lever 342 of the valve 346 is moved rearwardly, hydraulic fluid is directed through the conduit 340 to the hydraulic motor 44 to cause this motor to drive the ground engaging wheel 28 in a clockwise direction as this wheel is viewed in FIG. 10. In like manner, as the operating lever 345 is moved rearwardly, hydraulic fluid is directed through the valve 344 to the conduit 348 and as fluid flows from this conduit into the hydraulic motor 46, this motor drives the ground engaging wheel 30 in a clockwise or reverse direction as this wheel is viewed in FIG. 10.

It may be pointed out before proceeding further in a discussion of the operation of the hay swathing machine that the flow of hydraulic fluid in the hydraulic system of the invention is, in general, from the reservoir 54 through the conduit 302 to the hydraulic pump 52 which, as has been previously explained, is driven by the internal combustion engine 50. As the pump 52 pumps fluid from the reservoir 54, it delivers it via the conduit 306 to the flow divider fitting 304 and to the various flow divider fittings which are downstream from this fitting. Ultimately, the hydraulic fluid as divided by the various flow divider fittings will reach one of the control valves 318, 336, 360, 374, or 344. By means of these control valves, hydraulic fluid is directed to one of the several hydraulic motors in use, or to the hydraulic ram 234. After passing through the respective hydraulic motor or through the hydraulic ram 234, the hydraulic fluid is then, in general, passed back through the control valve at which it originated and then to the manifold 324. From the manifold 324, all incoming hydraulic fluid is ultimately discharged through the conduit 326 to the filter 328, and after passing through this filter, is returned to a reservoir 54.

As the hay swathing machine moves forwardly by the operator's described control of the rotation of the ground engaging wheels 28 and 30, the operator energizes the reel assembly 166, the conditioner rollers 100 and 102, and the auger conveyor assemblies 240 and 242 by pushing the control lever 362 forwardly to permit hydraulic fluid to pass through the valve 360 to the conduit 364. This conduit delivers the hydraulic fluid to the hydraulic motor 132. The hydraulic motor 132 directly drives the conditioner rollers 100 and 102 through the chain 128.

It will be seen from the manner in which the chain 128 engages the sprockets 126 and 144 keyed to the respective shafts 106 and 140 of the two conditioner rollers 100 and 102 that the conditioner rollers are driven in opposite directions so that hay which has been cut is moved between the conditioner rollers toward the rear of the apparatus. As the top conditioner roller 100 is driven in rotation, the reel assembly 166 and the auger conveyor assemblies 240 and 242 are concurrently driven in rotation by virtue of their driving connection to the top conditioner roller. Thus, the reel assembly 166 is driven by the belt 212 which passes around the pulley 210 and the idler pulley 214, and also around the pulley 136 which is keyed to the shaft 106 upon which the conditioner roller 100 is mounted. The auger conveyor assembly 240 is driven by the chain 270 which interconnects one of the sprockets 268 and the sprocket 124. The auger conveyor assembly 242 is driven by the chain 270 which interconnects the other of the sprockets 268 with the sprocket 122.

It should be pointed out that it is sometimes desirable to be able to reverse the direction of rotation of the conditioner rollers 100 and 102 to clear a blockage or jamming which may have occurred. This can be accomplished by the operator by moving the operating lever 362 rearwardly so as to reverse the flow of hydraulic fluid through the hydraulic pump 132. This causes a reversal in the direction of rotation of the sprocket 130, and thus the reel assembly 166, conditioner rollers 100 and 102, and auger conveyor assembies 240 and 242 are all caused to rotate in the opposite direction and from that in which they rotate when the operating lever 362 has been moved forwardly as hereinbefore described.

Concurrently with the activation of the reel assembly 166, conditioner rollers 100 and 102, and auger conveyor assemblies 240 and 242, the operator will activate the cutter blade 84 of the cutter bar assembly 82. This is accomplished by moving the control lever 375 of the control valve 374 forwardly to permit hydraulic fluid to pass through the conduit 376 to the hydraulic motor 98. This causes this hydraulic motor to be rotated which causes the cutter blade 84 to undergo reciprocation in a manner well understood in the art.

With the hay swathing machine 12 powered in the manner described, it moves forwardly and the reel assembly 166 contacts the top portions or upper end of the hay. The hay is thus bend toward the rear end of the hay swathing apparatus 12 and is led by the reel assembly 166 and the forward swath plates 221 into the cutter bar assembly 82. The reciprocating cutter blade 84 then severs the hay near the ground, and the forward motion of the machine causes the cut hay to move rearwardly over the guide plate 152 and the feed plate 150. From the feed plate 150, the cut hay moves between the conditioner rollers 100 and 102 where the stems are conditioned by contact with the ribs 104 carried by the conditioner rollers. After the cut and conditioned hay is passed between the conditioner rollers 100 and 102, the auger conveyor assemblies 240 and 242 function to move the hay toward the center of the hay swather apparatus, and to windrow it adjacent the central portion of this apparatus. The semicylindrical guide plates 250 located in the rearward portion of the auger conveyor asesmblies 240 and 242 assist the cylindrical members 244 and the blades 248 carried thereon in moving the hay inwardly toward the center of the machine.

Figure 4:
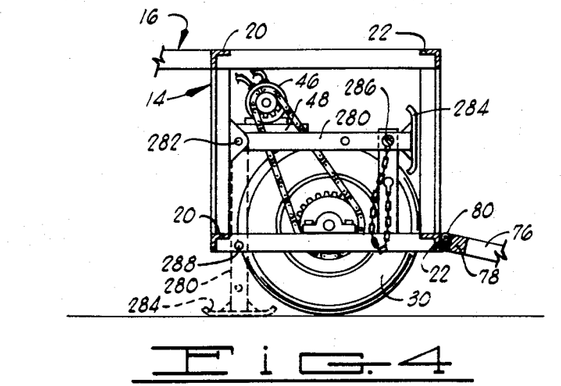
FIG. 4 is a fragmental sectional view taken along line 4—4 of FIG. 1 illustrating the lifting mechanism of the hay swather disposed in an inoperative condition. The operative status location of the lifting mechanism is illustrated in dashed lines.

After completion of the cutting and windrowing of the hay, when it is desired to move the hay swathing apparatus to another location at some distance, the lift members 280 are lowered as hereinbefore described, and are placed in the dashed line position illustrated in FIG. 4. This will shift the weight of the hay swathing apparatus to the foot plates 284, and will relieve the ground engaging wheels 28 and 30 of this weight. The transport wheels 290 are then lowered to the dashed line position shown in FIG. 5 and are locked in position by means of the lock pins 296. The clevis 70 and pin 72 can then be used to connect the hay swathing apparatus to a towing vehicle so that it can be pulled over the road to whatever location may be desired.

From the foregoing description of the invention, it will be seen that the present invention provides an improved, highly versatile hay swathing apparatus which is, as compared to many other hay swathing machines now being marketed, relatively economical in construction. It is flexible in the applications in which it may be used, and the operator can independently control most of the moving parts of the apparatus.

Although a preferred embodiment of the apparatus has been herein described, it is to be understood that various changes and modifications can be made in the illustrated and discussed structure without departure from the basic principles which underlie the invention. All changes and innovations of this type are deemed to be circumscribed by the spirit and scope of the invention.

What is claimed is:

1. Hay swather apparatus comprising:
   framework means having a forward end and a rear end;
   wheels supporting said framework means for movement over the ground;
   cutter means operatively mounted at the forward end of the framework means and including a blade mounted for transverse reciprocation relative to the direction of movement of the framework means on said wheels for cutting upstanding hay as the framework means moves over the ground;
   conditioner rollers rotatably mounted on said framework means rearwardly of said cutter means for receiving hay from said ccutter means and conditioning it;
   a reel assembly rotatably mounted on said framework means over said cutter means and ahead of said conditioner rollers to move hay to be cut toward the cutter means;
   two horizontally spaced auger conveyor assemblies rotatably mounted on the opposite sides of said framework means in transverse alignment with each other and immediately rearwardly from said conditioner rollers for receiving cut and conditioned hay from said conditioner rollers and moving said cut and conditioned hay into a central windrow; and
   first means for concurrently driving said conditioner rollers, reel assembly and auger conveyor assemblies in rotation;
   second means for driving the blade of the cutter means in reciprocation independently of said first driving means;
   third means for selectively driving one of said wheels in either direction of rotation; and
   fourth means for selectively driving the other of said wheels in either direction of rotation and independently of the drive to said one wheel from said third means.

2. Hay swather apparatus as defined in claim 1 wherein said conditioner rollers are vertically adjustable and detachably mounted on said frame work means, and wherein said auger conveyor assemblies are horizontally adjustably mounted on said framework means for movement to a position occupied by said conditioner rollers after detachment of the conditioner rollers from said framework means.

3. Hay swather apparatus as defined in claim 1 wherein said reel assembly comprises:
- a pair of end plates;
- a supporting shaft extending between said end plates;
- cylindrical means extending horizontally between, and secured to, said end plates, and rotatable about a horizontal axis, said cylindrical means including quadrant plates collectively arranged as a cylinder spaced radially outwardly from said supporting shaft;
- a plurality of wiping flanges extending continuously between said end plates and extending radially outwardly from said cylindrical means at circumferentially spaced intervals around said cylindrical means; and
- a plurality of spaced tines secured to the radially outer longitudinal edge of each of said wiping flanges, said tines being angulated away from the plane of the respective wiping flange to which they are attached, the inclination of said tines being toward the rear end of the framework means when the wiping flange to which the respective tine is attached occupies a vertical plane, said respective tine then extending at an angle of between about 20° and 60° with respect to the vertical.

4. Hay swather apparatus as defined in claim 1 and further characterized to include manual crank means for selectively adjusting the spacing of said reel assembly from said cutter means and from said conditioner rollers by elevating the reel assembly.

5. Hay swather apparatus as defined in claim 1 wherein said first driving means includes means for varying the direction of rotation of said conditioner rollers, reel assembly and auger conveyor assemblies and for varying the speed of rotation thereof.

6. Hay swather apparatus as defined in claim 1 wherein each of said first, second, third, and fourth driving means comprises:
- a hydraulic motor; and
- means for controlling the speed of said hydraulic motor.

7. Hay swather apparatus as dfined in claim 4 wherein said means for selectively adjusting the spacing of said reel assembly comprises:
- a pair of adjustable length supporting means each having a lower end secured to said framework means and an upper end secured to one end of said reel assembly; and
- means for manually changing the length of each of said adjustable length supporting means to change the height of said reel assembly above said framework means.

8. Hay swather apparatus comprising:
- framework means having opposite sides, a front and a rear;
- ground engaging wheels on said framework;
- means for hydraulically steering and braking said apparatus by controlling the rotational movement of said ground engaging wheels;
- a reel assembly rotatably and adjustably mounted on said framework adjacent the forward end thereof for rotation about a horizontal axis, and for vertical adjustment on said framework means;
- cutter means reciprocably mounted on said framework adjacent said reel assembly and adjustably spaced from said reel assembly;
- conditioner rollers rotatably mounted on said framework means to the rear of cutter means and adjustable in their spacing from each other;
- plate means for guiding and feeding hay to said conditioner rollers from said cutter means; and
- means adjustably mounting said plate means on said framework means for selectively adjusting the vertical level at which cut hay is discharged from said plate means;
- auger conveyor means positioned rearwardly from said reel assembly on said framework means and rotatably mounted on said framework means for rotation about a horizontal axis; and
- means drivingly interconnecting said reel assembly, auger conveyer means and conditioner rollers for concurrent rotation.

9. Hay swather apparatus as defined in claim 8 and further characterized as including means for adjusting the position of said conditioner rollers relative to each other, and for concurrently vertically adjusting said conditioner rollers on said framework means.

10. Hay swather apparatus as defined in claim 8 and further characterized as including:
- auger conveyor means positioned rearwardly from said reel assembly on said framework means and rotatably mounted on said framework means for rotation about a horizontal axis; and
- means drivingly interconnecting said reel assembly, auger conveyor means and conditioner rollers for concurrent rotation.

11. Hay swather apparatus comprising:
- framework means having opposite sides, a front end and a rear end;
- wheels supporting said framework means for movement over the ground;
- cutter means operatively mounted at the forward end of the framework means and including a blade mounted for transverse reciprocation relative to the direction of movement of the framework means on said wheels for cutting upstanding hay as the framework means moves over the ground;
- a pair of conditioner rollers mounted on said framework means rearwardly of the cutter means for receiving hay from said cutter means and conditioning it;
- means detachably secured to said framework means and journaling said conditioner rollers for rotation about a horizontal axes;
- a reel assembly rotatably mounted on said framework means over said cutter means and ahead of said conditioner rollers to move hay to be cut toward the cutter means;
- two horizontally spaced auger conveyor assemblies rotatably mounted on opposite sides of said framework means in transverse alignment with each other and immediately rearwardly from said conditioner rollers for receiving cut and condtioned hay from said conditioner rollers and moving said cut and conditioned hay into a central windrow, said auger conveyor assemblies being selectively adjustable in their position on said framework means without detachment from said framework means whereby said conditioner rollers may be removed from said framework means and the auger conveyor assemblies moved to the position previously occupied thereby.

12. Hay swather apparatus comprising:
- framework means having a forward end and a rear end;
- wheels supporting said framework means for movement over the ground;
- cutter means operatively mounted at the forward end of the framework means, including a blade mounted for transverse reciprocation relative to the direction of movement of the framework means on said wheels for cutting upstanding hay as the framework means moves over the ground;

conditioner rollers rotatably mounted on said framework means rearwardly of said cutter means for receiving hay from said cutter means and conditioning it;

means for selectively adjusting the path followed by cut hay in moving from said cutter means to said conditioner rollers, said selectively adjusting means comprising:
- a guide plate extending transversely across said framework means and located immediately to the rear of said cutter means;
- a feed plate hinged to said guide plate at the rear transverse edge thereof and extending transversely across the framework means, said feed plate having a rear edge adjacent said conditioner rollers; and
- means for selectively changing the inclination of the feed plate with respect to a horizontal plane;
- a reel assembly rotatably mounted on said framework means over said cutter means and ahead of said conditioner rollers to move hay to be cut toward the cutter means;
- two horizontally spaced auger conveyer assemblies rotatably mounted on the opposite side of said framework means in transverse alignment with each other and immediately rearwardly from said conditioner rollers for receiving cut and conditioned hay from said conditioner rollers and moving said cut and conditioned hay into a central windrow;
- first means for driving said conditioner rollers, reel assembly and auger conveyer assemblies in rotation;
- second means for driving the blade of the cutter means in reciprocation independently of said first driving means;
- third means for selectively driving one of said wheels in either direction of rotation; and
- fourth means for selectively driving the other of said wheels in either direction of rotation and independently of the drive to said one wheel from said third means.

13. Hay swather apparatus comprising:
a main frame having ground engaging wheels rotatably mounted on opposite sides thereof and having a forward side and a rear side;
a forwardly extending frame pivotally connected to the forward side of said main frame for pivotation about a horizontal axis;
a cutter bar assembly mounted on, and extending transversely across, the forward end of said forwardly extending frame;
a reel assembly rotatably mounted on said forwardly extending frame above said cutter bar assembly for rotation about a horizontal axis; and
means for manually adjusting the height of said reel assembly above said cutter bar assembly, said means for manually adjusting the height of said reel assembly comprising:
- posts secured on said forwardly extending frame and projecting upwardly therefrom on opposite sides of said reel assembly;
- tubular members telescoped over the upper end portions of said posts;
- bearing blocks secured to the upper end portions of said tubular members and rotatably journaling opposite ends of said reel assembly;
- means resiliently biasing said tubular members upwardly with respect to said posts; and
- means for manually selectively adjusting the upward force exerted upon said tubular members by said resilient biasing means.

14. Hay swather apparatus comprising:
framework means having opposite sides, a front and a rear;
ground engaging wheels on said framework;
means for hydraulically braking and steering said apparatus by controlling the rotational movement of said ground engaging wheels;
a reel assembly rotatably mounted on said framework means adjacent to forward end thereof;
cutter means reciprocably mounted on said framework means adjacent said reel assembly;
conditioner rollers rotatably mounted on said framework means to the rear of said cutter means;
plate means for guiding and feeding hay to said conditioner rollers from said cutter means; and
means adjustably mounting said plate means on said framework means for selectively adjusting the vertical level at which cut hay is discharged from said plate means;
auger conveyor means adjustably mounted on said framework means for positioning rearwardly from said conditioner rollers, or alternatively, for positioning in place of said conditioner rollers when said conditioner rollers are detached from said framework means.

15. Hay swather apparatus comprising:
framework means having a forward end and a rear end;
wheels supporting said framework means for movement over the ground;
cutter means operatively mounted on the forward end of said framework means and including a blade mounted for transverse reciprocation relative to the direction of the movement of the framework means on said wheel for cutting upstanding hay as the framework means moves over the ground;
conditioner rollers rotatably mounted on said framework means rearwardly of said cutter means for receiving hay from said cutter means and conditioning it;
a guide plate extending transversely of said framework means and located rearwardly of said cutter means;
a feed plate pivoted to said guide plate at the rear transverse edge thereof and extending transversely on said framework means, said feed plate having a rear edge adjacent said conditioner rollers;
means for selectively changing the inclination of said feed plate with respect to a horizontal plate;
a reel assembly rotatably mounted on said framework means over said cutter means and ahead of said conditioner rollers to move hay to be cut toward the cutter means;
two horizontally spaced auger conveyor assemblies rotatably mounted on the opposite sides of said framework means in transverse alignment with each other, and immediately rearwardly from said conditioner rollers for receiving cut and conditioned hay from said conditioner rollers and moving said cut and conditioned hay into a central windrow;
first means for driving said conditioner rollers, reel assembly and auger conveyor assembles in rotation;
second means for driving the blade of the cutter means in reciprocation independently of said first driving means; and
additional means for driving the said wheels on said framework in rotation.

16. A hay swather apparatus comprising:
a main frame having ground engaging wheels rotatably mounted on opposite sides thereof, and having a forward side and a rear side;
a forward extending frame pivotally connected to the forward side of said main frame for pivotation about a horizontal axis;
a cutter bar assembly mounted on and extending transversely across, the forward end of said forwardly extending frame;

a reel assembly rotatably mounted on said forwardly extending frame above said cutter bar assembly for rotation about a horizontal axis; and means for adjusting the height of said reel assembly above said cutter bar assembly, said adjusting means comprising:

posts secured on said forwardly extending frame and projecting upwardly therefrom on opposite sides of said reel assembly;

tubular members telescopingly engaging said posts;

bearing blocks secured to said tubular members and rotatably journaling opposite end of said reel assembly;

means for selectively adjusting the relative position of said tubular members to the respective posts with which the respective tubular members are telescopingly engaged.

References Cited

UNITED STATES PATENTS

| | | | |
|---|---|---|---|
| 1,026,486 | 5/1912 | Benson | 56—227 |
| 2,833,105 | 5/1958 | Naery | 56—23 X |
| 2,986,841 | 6/1961 | MacDonald | 56—1 C |
| 3,079,742 | 3/1963 | Balzer | 56—1 C |
| 3,085,384 | 4/1963 | Adee et al. | 56—1 C |
| 3,151,429 | 10/1964 | Dyrdahl | 56—23 |
| 3,207,244 | 9/1965 | Becker et al. | 180—6.48 |
| 3,224,177 | 12/1965 | Adee | 56—23 |
| 3,230,694 | 1/1966 | Fairbank et al. | 56—23 |
| 3,241,300 | 3/1966 | Fell et al. | 56—23 |
| 3,279,158 | 10/1966 | Kirkpatrick et al. | 56—228 |
| 3,336,735 | 8/1967 | Schoenwald | 56—23 |
| 3,363,407 | 1/1968 | Drummond | 56—23 |
| 3,402,533 | 9/1968 | Johnston et al. | 56—23 |
| 3,411,274 | 11/1968 | Jarvis | 56—1 CX |

LOUIS G. MANCENE, Primary Examiner

J. N. ESKOVITZ, Assistant Examiner

U.S. Cl. X.R.

56—10.7, 10.9, 11.9, 14.4, 15.2, 192